(12) United States Patent
Feldman et al.

(10) Patent No.: US 11,420,105 B2
(45) Date of Patent: Aug. 23, 2022

(54) ORAL DEVICE HAVING WEDGES AND METHOD OF MANUFACTURE

(71) Applicant: Custom Club, Inc., Scottsdale, AZ (US)

(72) Inventors: Blair Feldman, Paradise Valley, AZ (US); Craig Weiss, Paradise Valley, AZ (US)

(73) Assignee: CUSTOM CLUB, INC., Scottsdale, AZ (US)

( * ) Notice: Subject to any disclaimer, the term of this patent is extended or adjusted under 35 U.S.C. 154(b) by 0 days.

(21) Appl. No.: 17/249,466

(22) Filed: Mar. 2, 2021

(65) Prior Publication Data
US 2021/0275894 A1 Sep. 9, 2021

Related U.S. Application Data

(60) Provisional application No. 62/985,163, filed on Mar. 4, 2020.

(51) Int. Cl.
*A63B 71/08* (2006.01)
*B29C 51/14* (2006.01)
*B29L 31/00* (2006.01)

(52) U.S. Cl.
CPC ............ *A63B 71/085* (2013.01); *B29C 51/14* (2013.01); *B29L 2031/768* (2013.01)

(58) Field of Classification Search
CPC ... A61F 5/56; A61F 5/566; A61F 5/50; A63B 71/085; A63B 2208/12; A63B 2071/088; A63B 2071/086; A63B 71/08; A61B 13/00; A61C 5/14
See application file for complete search history.

(56) References Cited

U.S. PATENT DOCUMENTS

| | | | |
|---|---|---|---|
| 3,518,988 A | 7/1970 | Gores | |
| 5,152,301 A * | 10/1992 | Kittelsen | A63B 71/085 128/846 |
| 5,339,832 A * | 8/1994 | Kittelsen | A61C 19/063 128/862 |
| 5,443,384 A * | 8/1995 | Franseen | A61C 7/00 433/18 |
| 5,611,355 A | 3/1997 | Hilsen | |
| 5,826,581 A * | 10/1998 | Yoshida | A63B 71/085 128/859 |
| 5,899,691 A | 5/1999 | Parker et al. | |

(Continued)

OTHER PUBLICATIONS

USPTO, Hawthorne, Ophelia USPTO Office Action for U.S. Appl. No. 17/249,466, 13 pages, dated Oct. 22. 2021, USA.*

(Continued)

*Primary Examiner* — Ophelia A Hawthorne
(74) *Attorney, Agent, or Firm* — Bookoff McAndrews, PLLC

(57) ABSTRACT

An oral device may include a body. The body may have a main portion having an arch-shaped central portion, a first side portion extending from a first end of the central portion, and a second side portion extending from a second end of the central portion. The body may further include a first wedge portion provided on a bottom surface of the first side portion, and a second wedge portion provided on a bottom surface of the second side portion. Each of the first wedge portion and the second wedge portion may have a varying thickness.

16 Claims, 5 Drawing Sheets

(56) References Cited

U.S. PATENT DOCUMENTS

| | | | |
|---|---|---|---|
| 6,371,758 B1* | 4/2002 | Kittelsen | A63B 71/085 128/861 |
| 6,415,794 B1 | 7/2002 | Kittelsen et al. | |
| 6,505,626 B2 | 1/2003 | Kittelsen et al. | |
| 6,505,627 B2 | 1/2003 | Kittelsen et al. | |
| 6,505,628 B2 | 1/2003 | Kittelsen et al. | |
| 6,508,251 B2 | 1/2003 | Kittelsen et al. | |
| 6,510,853 B1 | 1/2003 | Kittelsen et al. | |
| 6,539,943 B1 | 4/2003 | Kittelsen et al. | |
| 6,588,430 B2 | 7/2003 | Kittelsen et al. | |
| 6,598,605 B1 | 7/2003 | Kittelsen et al. | |
| 6,626,180 B1 | 9/2003 | Kittelsen et al. | |
| 6,675,806 B2 | 1/2004 | Kittelsen et al. | |
| 6,675,807 B2 | 1/2004 | Kittelsen et al. | |
| 6,691,710 B2 | 2/2004 | Kittelsen et al. | |
| 7,156,774 B2 | 1/2007 | Mohindra | |
| 7,549,423 B1 | 6/2009 | Hirshberg | |
| 7,637,262 B2 | 12/2009 | Bailey | |
| D639,439 S | 6/2011 | Raad | |
| 8,074,658 B2 | 12/2011 | Kittelsen et al. | |
| 8,113,206 B2 | 2/2012 | Roettger et al. | |
| 8,156,940 B2 | 4/2012 | Lee | |
| 8,166,976 B2 | 5/2012 | Webster et al. | |
| 8,567,408 B2 | 10/2013 | Roettger et al. | |
| 8,585,401 B2 | 11/2013 | Moses | |
| 9,545,332 B2 | 1/2017 | Luco | |
| 9,655,695 B2 | 5/2017 | Ross | |
| 9,668,827 B2 | 6/2017 | Roettger et al. | |
| 9,820,882 B2 | 11/2017 | Liptak et al. | |
| 9,844,424 B2 | 12/2017 | Wu et al. | |
| 9,861,513 B2 | 1/2018 | Rayek et al. | |
| 9,943,386 B2 | 4/2018 | Webber et al. | |
| 9,943,991 B2 | 4/2018 | Tanugula et al. | |
| 9,949,868 B2 | 4/2018 | Kim et al. | |
| 2003/0101999 A1* | 6/2003 | Kittelsen | A63B 71/085 128/859 |
| 2007/0197876 A1 | 8/2007 | Lane | |
| 2007/0283967 A1* | 12/2007 | Bailey | A61F 5/566 128/848 |
| 2010/0252053 A1* | 10/2010 | Garner | A63B 71/085 128/845 |
| 2010/0269836 A1* | 10/2010 | Roettger | A61C 5/90 433/214 |
| 2010/0275930 A1 | 11/2010 | Evans | |
| 2013/0118507 A1 | 5/2013 | Chappuis | |
| 2014/0000633 A1 | 1/2014 | Hernandez | |
| 2014/0069441 A1 | 3/2014 | Moses | |
| 2015/0075540 A1 | 3/2015 | Dye | |
| 2015/0272773 A1 | 10/2015 | Rico et al. | |
| 2015/0305919 A1 | 10/2015 | Stubbs et al. | |
| 2016/0120619 A1 | 5/2016 | Bons | |
| 2017/0000643 A1 | 1/2017 | Gelb et al. | |
| 2017/0014262 A1 | 1/2017 | Dietz | |
| 2017/0020716 A1 | 1/2017 | Hart et al. | |
| 2017/0120135 A1 | 5/2017 | Engel et al. | |
| 2017/0202644 A1 | 7/2017 | Ross | |
| 2017/0282451 A1 | 10/2017 | Layzell et al. | |
| 2018/0000564 A1 | 1/2018 | Cam et al. | |
| 2018/0056167 A1* | 3/2018 | Wisniewski | A63B 71/085 |
| 2018/0071135 A1 | 3/2018 | Ingemarsson-Matzen | |
| 2018/0133581 A1 | 5/2018 | Segal | |
| 2018/0193182 A1 | 7/2018 | Wiffen | |
| 2018/0193183 A1 | 7/2018 | Kim et al. | |
| 2018/0207020 A1 | 7/2018 | Hart et al. | |
| 2018/0344511 A1* | 12/2018 | Brown | A61F 5/566 |
| 2019/0021901 A1 | 1/2019 | LeBlanc et al. | |
| 2019/0344150 A1 | 11/2019 | Dreve | |

OTHER PUBLICATIONS

WIPO, International Search Report and the Written Opinion of the International Searching Authority of parent PCT Application No. PCT/US2021/020677, 14 pages.*

* cited by examiner

ORAL DEVICE HAVING WEDGES AND METHOD OF MANUFACTURE

CROSS-REFERENCE TO RELATED APPLICATION

This application claims the benefit of priority from U.S. Provisional Application No. 62/985,163, filed on Mar. 4, 2020, which is incorporated by reference herein in its entirety.

TECHNICAL FIELD

The present disclosure relates generally to an oral device, such as a mouthguard or a retainer, and a related method of manufacturing the oral device.

BACKGROUND

Oral devices, such as mouthguards, are used by individuals to protect at least their teeth, upper jaw (maxilla), and lower jaw (mandible) from injury. A mouthguard is worn on at least one of an upper set of teeth or a lower set of teeth of a user. The mouthguard may be formed in an arch shape, with an inner surface that contacts the teeth of the user, and an outer surface that is smoothed to reduce irritation to the gums and cheeks of the user. By virtue of a thickness of the mouthguard, the mouthguard provides shock absorbency to protect the user from injury. Such a mouthguard may be clenched between the upper set of teeth and the lower set of teeth of the user, particularly during physical activity of the user (e.g., during a sporting event).

When such a mouthguard is clenched between the upper set of teeth and the lower set of teeth, airflow through the mouth of the user may be inhibited, due to the position of the mouthguard between the upper teeth and the lower teeth.

Similarly, retainers, often used to maintain positioning of teeth following long-term orthodontic treatment (e.g., braces), also suffer from the same drawback. That is, due to the closing of the maxilla and the mandible with the retainer positioned therebetween, airflow through the mouth of the user may be inhibited.

The oral device and related method of manufacture of the present disclosure may solve one or more of the problems set forth above and/or other problems in the art. The scope of the current disclosure, however, is defined by the attached claims, and not by the ability to solve any specific problem.

SUMMARY

In one aspect of the disclosure, an oral device may include a body. The body may have a main portion having an arch-shaped central portion, a first side portion extending from a first end of the central portion, and a second side portion extending from a second end of the central portion. The body may further include a first wedge portion provided on a bottom surface of the first side portion, and a second wedge portion provided on a bottom surface of the second side portion. Each of the first wedge portion and the second wedge portion may have a varying thickness.

According to a further aspect of this disclosure, an oral may have a body. The body may have an inner surface configured to receive one of upper teeth or lower teeth of a user and a bottom surface configured to face another one of the upper teeth or the lower teeth of the user. The body may include a main portion having an arch-shaped central portion, a first side portion extending from a first end of the central portion, and a second side portion extending from a second end of the central portion. Further, the body may include a first wedge portion provided on a bottom surface of the first side portion, and a second wedge portion provided on a bottom surface of the second side portion. Each of the first wedge portion and the second wedge portion may have an anterior end, positioned closest to the central portion of the main portion, and a posterior end, positioned farthest from the central portion of the main portion. Each of the first wedge portion and the second wedge portion may have a varying thickness from the posterior end to the anterior end.

According to a further aspect of this disclosure, a method of manufacturing an oral device may include: applying heat and pressure to a moldable material around one of an impression of upper teeth or an impression of lower teeth of a user, forming a molded structure; trimming excess material, of the moldable material, from the molded structure forming a body of the oral device, the body including a main portion having an arch-shaped central portion, a first side portion extending from a first end of the central portion, and a second side portion extending from a second end of the central portion; forming, using the excess moldable material and/or additional moldable material, a first wedge portion and a second wedge portion, each of the first wedge portion and the second wedge portion having a varying thickness; and attaching the first wedge portion to a bottom surface of the first side portion, and the second wedge portion to a bottom surface of the second side portion.

DETAILED DESCRIPTION

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Figure 1:
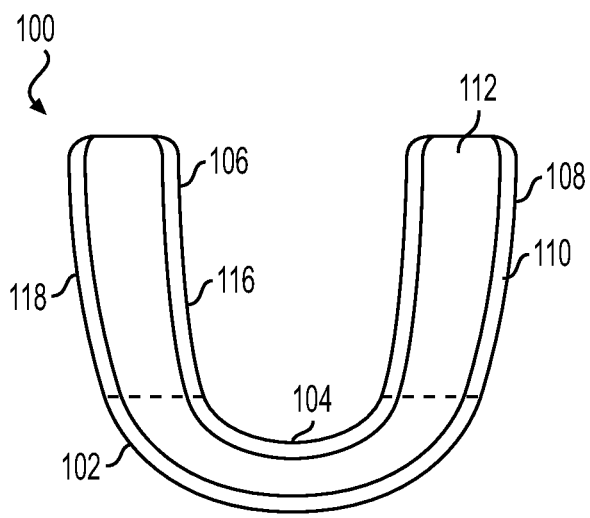
FIG. 1 shows a schematic top view of an oral device, according to the present disclosure.

FIG. 1 shows a top schematic view of an oral device 100, which may be a mouthguard, a retainer, or another oral appliance. The oral device 100 has a body or an arch-shaped main portion 102 that includes a central or anterior portion 104, and two side or posterior portions, including a first side portion 106 that extends from one end of the central portion 104, and a second side portion 108, extending from another end of the central portion 104. The main portion 102 has an upper surface 110 with a recess 112 formed therein. The recess 112 is shaped to receive teeth 114 of a user, shown in FIG. 4. The main portion 102 also has an inner surface 116 and an outer surface 118.

Figure 2:
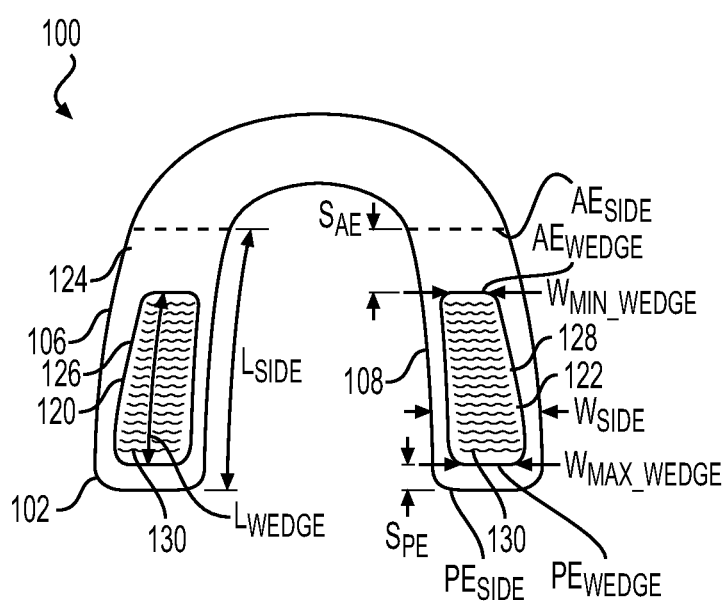
FIG. 2 shows a schematic bottom view of the oral device shown in FIG. 1.

FIG. 2 shows a bottom schematic view of the oral device 100. The oral device 100 has two wedge portions, including a first wedge portion 120 and a second wedge portion 122 attached to a bottom or lower surface 124 of the main portion 102. One wedge portion, or a first wedge portion, 120 is attached to the first side portion 106, and the second wedge portion 122 is attached to the second side portion 108. The first wedge portion 120 has a first wedge bottom surface 126, and the second wedge portion 122 has a second bottom surface 128. One or more ridges 130 may be provided on each of the first wedge bottom surface 126 and the second bottom surface 128. The ridges 130 may be shaped to fit the teeth 114 of the user. For example, the ridges 130 may be molded or otherwise formed in a shape complimentary to a shape or geometry of a user's teeth such that, upon positioning the oral device 100 within a user's mouth 132 along an upper set of teeth, the ridges 130 engage with the user's lower set of teeth, or vice versa. The ridges 130 may also have a surface texture for gripping or traction purposes, so as to prevent translation of a lower jaw of a user relative to an upper jaw.

Each of the first side portion 106 and the second side portion 108 has a width $W_{SIDE}$, which may be 3 mm, and a length $L_{SIDE}$, which may be 30.5 mm, for example. The width $W_{SIDE}$ and the length $L_{SIDE}$ are not, however, limited to these values, and may be a value in a range of 1 mm to 5 mm and 20 mm to 40 mm, respectively. Each of the first wedge portion 120 and the second wedge portion 122 may have a maximum width $W_{MAX\_WEDGE}$ at a posterior end thereof, a minimum width $W_{MIN\_WEDGE}$ at an anterior end thereof, and a length $L_{WEDGE}$. In the embodiment shown in FIG. 2, the maximum width $W_{MAX\_WEDGE}$ of each wedge portion may be 15 mm, the minimum width $W_{MIN\_WEDGE}$ may be 5 mm, and the length $L_{WEDGE}$ may be 35 mm, for example. The maximum width $W_{MAX\_WEDGE}$, the minimum width $W_{MIN\_WEDGE}$, and the length $L_{WEDGE}$ are not, however, limited to these values, and may be a value in a range of 5 mm to 15 mm, 5 mm to 10 mm, and 15 mm to 40 mm, respectively. The relationship between the minimum width $W_{MIN\_WEDGE}$ and the maximum width $W_{MAX\_WEDGE}$ may be 1:4 to 1:1, for example. Alternatively, the relationship between the minimum width $W_{MIN\_WEDGE}$ and the maximum width $W_{MAX\_WEDGE}$ may be expressed in terms of a fraction. For example, the minimum width $W_{MIN\_WEDGE}$ may be between ¼ of the maximum width $W_{MAX\_WEDGE}$ up to one whole, that is, equal to the maximum width $W_{MAX\_WEDGE}$. Still further, the relationship between the minimum width $W_{MIN\_WEDGE}$ and the maximum width $W_{MAX\_WEDGE}$ may be expressed in terms of a percentage. For example, the minimum width $W_{MIN\_WEDGE}$ may be 10% to 100% the maximum width $W_{MAX\_WEDGE}$. In addition, a relationship between the maximum width $W_{MAX\_WEDGE}$ and the side width $W_{SIDE}$ may be 1:5 to 1:2, for example. Alternatively, the relationship between the maximum width $W_{MAX\_WEDGE}$ and the side width $W_{SIDE}$ may be expressed in terms of a percentage. For example, the maximum width $W_{MAX\_WEDGE}$ may be between 20% and 50% the side width $W_{SIDE}$. The maximum width $W_{MAX\_WEDGE}$ may be less than the side width $W_{SIDE}$. A relationship between the minimum width $W_{MIN\_WEDGE}$ and the side width $W_{SIDE}$ may be 1:5 to 1:2, for example. Alternatively, the relationship between the minimum width $W_{MIN\_WEDGE}$ and the side width $W_{SIDE}$ may be expressed in terms of a percentage. For example, the minimum width $W_{MIN\_WEDGE}$ may be between 20% and 50% the side width $W_{SIDE}$. The minimum width $W_{MIN\_WEDGE}$ may be less than the side width $W_{SIDE}$. Further, a relationship between the wedge length $L_{WEDGE}$ and the side length $L_{SIDE}$ may be 1:2 to 1:1. Alternatively, the relationship between the wedge length $L_{WEDGE}$ and the side length $L_{SIDE}$ may be expressed as a percentage. For example, the wedge length $L_{WEDGE}$ may be between 50% and 100% the side length $L_{SIDE}$. The wedge length $L_{WEDGE}$ may be less than the side length $L_{SIDE}$. The relationships between the minimum width $W_{MIN\_WEDGE}$ and the maximum width $W_{MAX\_WEDGE}$, the maximum width $W_{MAX\_WEDGE}$ and the side width $W_{SIDE}$, the minimum width $W_{MIN\_WEDGE}$ and the side width $W_{SIDE}$, and the wedge length $L_{WEDGE}$ and the side length $L_{SIDE}$ are not, however, limited to these ratios, and may be in a range of 1:5 to 1:1.

In addition, a position of the first wedge portion 120 on the first side portion 106 and a position of the second wedge portion 122 on the second side portion 108 may be defined by the length $L_{WEDGE}$ of each wedge portion, and a posterior spacing $S_{PE}$ between a posterior end $PE_{SIDE}$ of a respective side portion and a poster end $PE_{WEDGE}$ of the respective wedge portion, and an anterior spacing SAE between an anterior end $AE_{SIDE}$ of the respective side portion and an anterior end $AE_{WEDGE}$ of the respective wedge portion. In the embodiment shown in FIG. 2, the posterior spacing $S_{PE}$ may be 1.5 mm, and the anterior spacing SAE may be 1.5 mm. The posterior spacing $S_{PE}$ and the anterior spacing SAE are not, however, limited to these values, and may be a value in a range of 1 mm to 3 mm and a range of 1 mm to 3 mm, respectively. It is noted that, as shown in FIG. 2, a width of each of the first wedge portion 120 and the second wedge portion 122 may taper (e.g., narrow) in an anterior direction. That is, the maximum width $W_{MAX\_WEDGE}$ of a respective wedge portion may be closer to the posterior end $PE_{SIDE}$ of a respective side portion, while the minimum width $W_{MIN\_WEDGE}$ of a respective wedge portion may be closer to the anterior end $AE_{SIDE}$ of the respective side portion. This arrangement accommodates wider teeth, e.g., molars, toward a posterior of the mouth 132 of the user.

Figure 3:
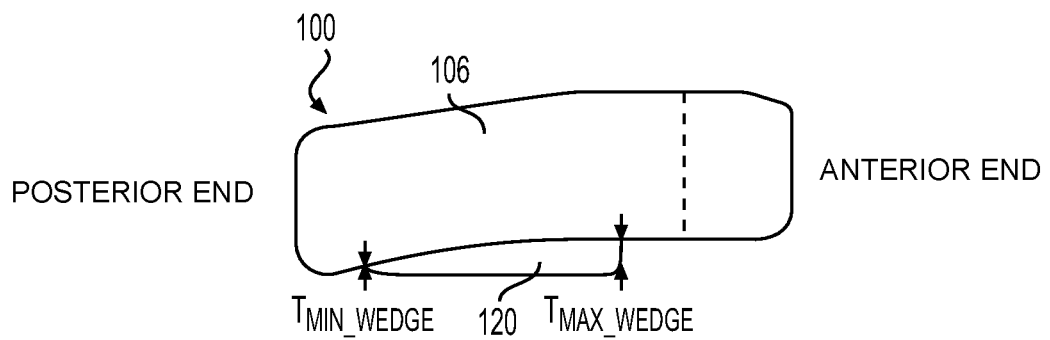
FIG. 3 shows a schematic side view of the oral device shown in FIGS. 1 and 2.

FIG. 3 shows a side schematic view of the oral device 100. As shown in FIG. 3, the first wedge portion 120 has a varying thickness, and, more specifically, a tapered shape or profile. The varying thickness of each wedge portion complements the natural slope of the teeth 114 of the user, while maintaining a space 138, described in more detail below, between the upper teeth 134 and the lower teeth 136 of the user. At the posterior end, the first wedge portion 120 has a minimum wedge thickness $T_{MIN\_WEDGE}$, and, at the anterior end, the first wedge portion 120 has a maximum wedge thickness $T_{MAX\_WEDGE}$. As shown, the thickness of the wedge portions taper (e.g., narrow) in a posterior direction. That is, the thickness of the wedge portions taper from the anterior ends thereof to the posterior ends thereof. In the embodiment shown in FIG. 3, the minimum thickness $T_{MIN\_WEDGE}$ may be 0.5 mm, and the maximum thickness $T_{MAX\_WEDGE}$ may be 5 mm, for example. The minimum thickness $T_{MIN\_WEDGE}$ and the maximum thickness $T_{MAX\_WEDGE}$ are not, however, limited to these values, and may be a value within a range of 0.25 mm to 3 mm and 1 mm to 6 mm, respectively. The relationship between the minimum thickness $T_{MIN\_WEDGE}$ and the maximum thickness $T_{MAX}$ may be, for example, 1:3. The relationship is not, however, limited to 1:3, and may be 1:10 to 1:1.5.

The dimensions of the wedges may be selected to uniquely correspond to the anatomy of a particular user. That is, the widths and the lengths of the wedge portions may be selected based on a width and a length of the teeth 114 of the user, and, more specifically, the width and the length of the teeth 114 of the user located toward a posterior end of the mouth 132 of the user. In addition, the thicknesses of the wedge portions may be selected based on a height of the teeth 114 of the user, and, more specifically, the height of the teeth 114 of the user located toward the posterior end of the mouth 132. For example, the maximum width $W_{WEDGE\_MAX}$ of a wedge portion may be equal to or greater than a greatest width of the teeth 114 of the user, from an anterior-most tooth to a posterior-most tooth. In addition, the length $L_{WEDGE}$ of a wedge portion may be equal to or less than a length between the anterior-most tooth to the posterior-most tooth. Further, the maximum thickness $T_{WEDGE\_MAX}$ of a wedge portion may be up to 150% of a greatest height of the teeth 114 of the use, from the anterior-most tooth to the posterior-most tooth.

Figure 4:
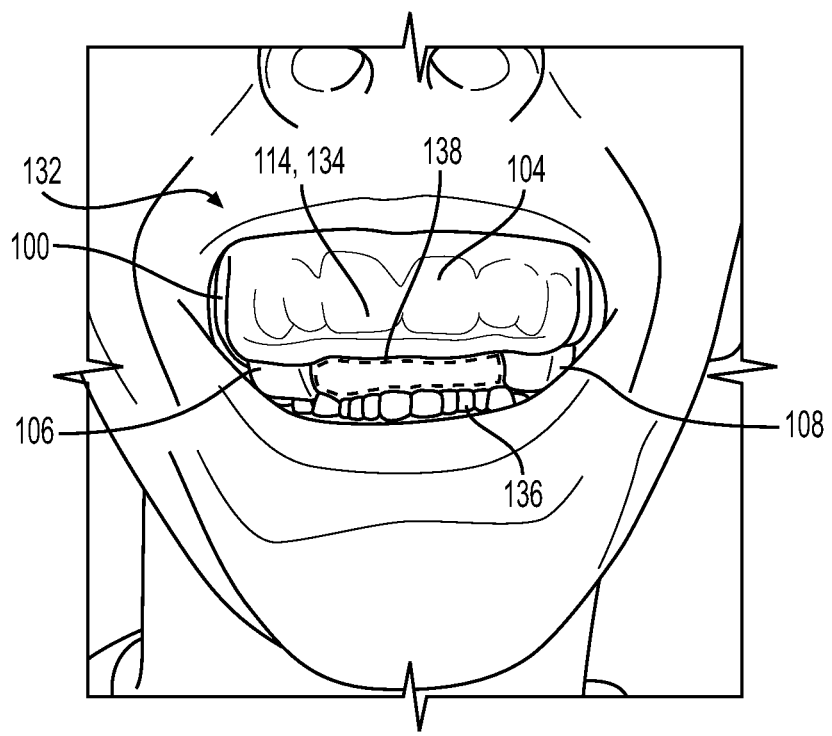
FIG. 4 shows a schematic view of the oral device in a mouth of a user.

FIG. 4 shows a schematic view of the oral device 100 in a mouth 132 of a user. The oral device 100 is positioned around the teeth 114 of the user. More specifically, in the embodiment shown in FIG. 4, the recess 112 is filled by upper teeth 134 of the user. The first wedge portion 106 and the second wedge portion 108 are positioned between the upper teeth 134 and lower teeth 136 of the user. A space 138 is formed between the upper teeth 134 and the lower teeth 136 of the user, by virtue of the first wedge portion 106 and the second wedge portion 108. That is, the first wedge portion 106 and the second wedge portion 108 inhibit or prevent complete closure of the jaws of a user, thereby maintaining the space 138 between the upper teeth 134 and the lower teeth 136, which may facilitate air flow, as will be described in further detail below. A lateral dimension or width of the space 138 may be measured from a midpoint of an upper canine, of the upper teeth 134, on one side of the user's mouth 132, to a midpoint of an upper canine, of the upper teeth 134, on the other side of the user's mouth 132. A height of the space 138 may be titrated, or tailored to the user, based on the needs of the user, and may range from 1 mm to 5 mm, for example.

The oral device 100 of the present disclosure provides for protection of teeth, jaw bones, etc., of a user and prevention of injury, while maintaining airflow through the mouth 132 of the user. In particular, the particular shape and positioning of the wedge portions of the oral device 100 maintain the airflow by forming a space 138 between the upper teeth 134 and the lower teeth 136 of the user, when the oral device 100 is in the mouth 132 of the user. As such, a user may readily intake and exhale air through their mouth, via space 138, while oral device 100 is being used.

Figure 5:
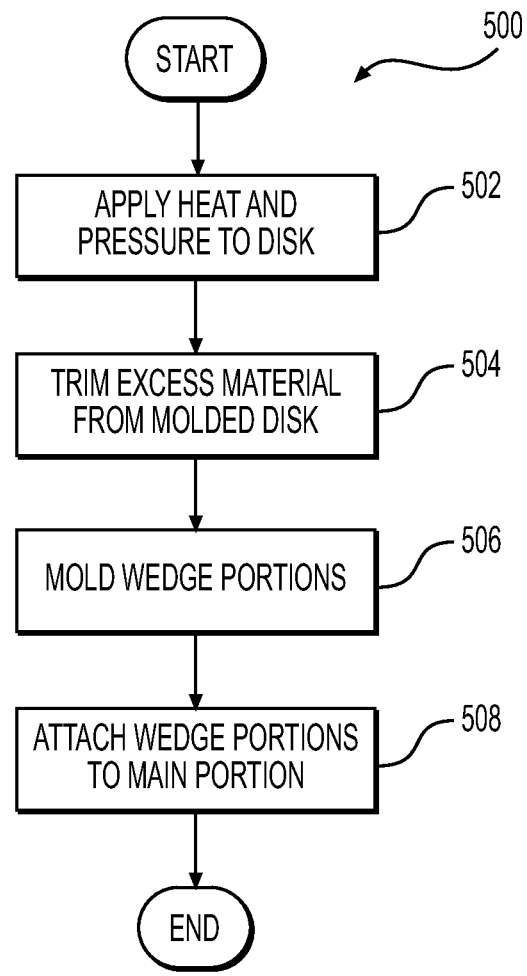
FIG. 5 shows a flowchart for a method of manufacturing the oral device, according to the present disclosure.
Figure 6:
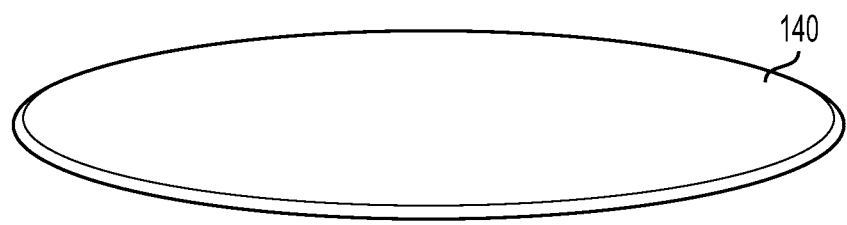
FIG. 6 shows a disk of a moldable material.
Figure 7:
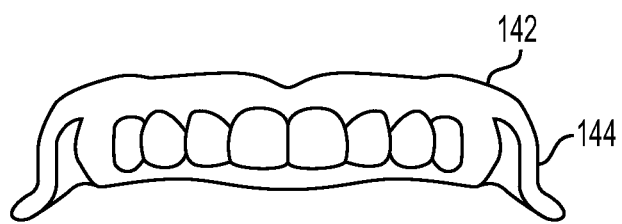
FIG. 7 shows a molded disk having excess material.
Figure 8:
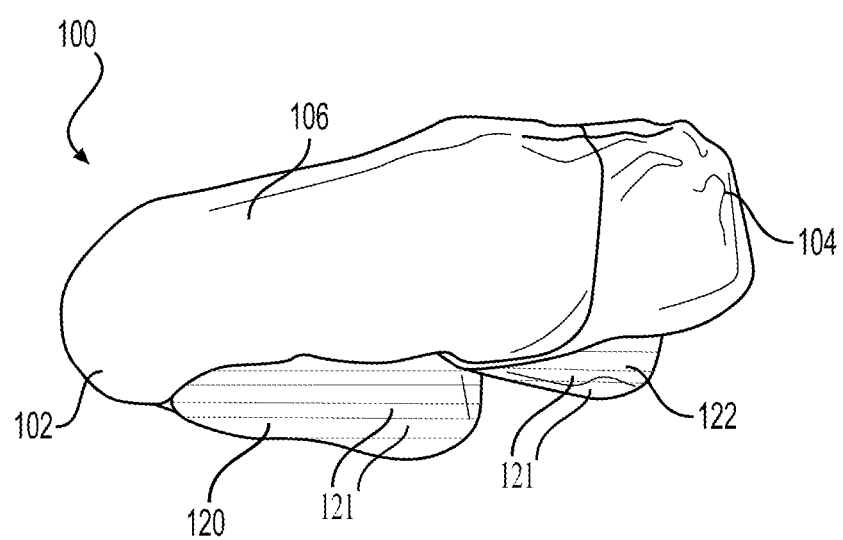
FIG. 8 shows a schematic isometric view of the oral device formed by the method.

FIG. 5 shows a flowchart for a method 500 of manufacturing the oral device 100, according to the present disclosure. In step 502, heat and pressure are applied to a disk 140 of a moldable material, shown in FIG. 6. Although a circular disk 140 is described and shown in FIG. 6, the disk 140 may be square, rectangular, or another shape. Using a circular disk, however, reduces an overall amount of excess material 144, described in more detail below. The moldable material may be, for example, polyvinyl siloxane, ethylene vinyl acetate, rubber, or plastic. The moldable material is not, however, limited to these exemplary materials. The disk 140 may have a thickness of 1 mm to 4 mm. More specifically, the disk 140 is pressed onto and around an impression of one of the upper teeth 134 and the lower teeth 136 of the user, and heat is applied to thereby form a molded disk 142, shown in FIG. 7. More specifically, the disk 140 may be placed into a machine, such as a Drufomat Scan Pressure Machine, along with the impression, and heat and pressure are applied to the disk 140 by a heat element in a pressure forming area of the machine. Then, in step 504, excess material 144 is trimmed from the molded disk 142, thereby forming the main portion 102 of the oral device 100. The excess material includes portions of the molded disk 142 around edges or near a center of the disk that do not conform to the shape of the impression. Trimming may be performed by, for example, using a cutting instrument (e.g., knife, blade, scissor, etc.). In step 506, the trimmed excess material 144 and/or additional moldable material is molded to form the first wedge portion 120 and the second wedge portion 122. And, in step 508, the first wedge portion 120 and the second wedge portion 122 are attached to the bottom surface 124 of the main portion 102 of the oral device 100, as shown in FIG. 8. In particular, the first wedge portion 120 is attached to the first side portion 106, and the second wedge portion 122 is attached to the second side portion 108. The first wedge portion 120 and the second wedge portion 122 may be attached by applying heat to the bottom surface 124 of the main portion 102, and/or to upper surfaces of the first wedge portion 120 and the second wedge portion 122. The heat may melt at least a portion of the first wedge portion 120 and the second wedge portion 122 onto the main portion 102. Then, the upper surfaces of the first wedge portion 120 and the second wedge portion 122 are pressed onto the lower surface 124 of the main portion 102. Pressing of the first wedge portion 120 and the second wedge portion 122 may be performed manually or by a machine. And, after the first wedge portion 120 and the second wedge portion 122 are pressed onto the main portion 102, they may be held together with the main portion 102 by, for example, a vice or a clamp, to ensure the wedge portions are secured to the main portion 102. Alternatively or additionally, a laminate material may be overlayed on the attached main portion 102 and the wedge portions to secure the main portion 102 and the wedge portions in place. In addition, the first wedge portion 120 and the second wedge portion 122 are attached to the main portion 102 so that the posterior ends $PE_{WEDGE}$ of the first wedge portion 120 and the second wedge portion 122, having the minimum wedge thickness $T_{MIN\_WEDGE}$, are near the posterior ends $PE_{SIDE}$ of the first side portion 106 and the second side portion 108, respectively, and the anterior ends $AE_{WEDGE}$ of the first wedge portion 120 and the second wedge portion 122, having the maximum wedge thickness $T_{MAX\_WEDGE}$, are near the anterior ends $AE_{SIDE}$ of the first side portion 106 and the second side portion 108.

Although the method 500 is described as including steps 502 to 508, the method 500 may include additional steps. For example, the method 500 may further include a step of scanning the mouth 132 of the user using a three-dimensional imaging technique, and a step of forming the impression of the teeth 114 of the user. The method 500 may also include, in the step 506, positioning the first wedge portion 120 on the first side portion 106 and the second wedge portion 122 on the second side portion 108, based on a target anterior end spacing SAE and/or a target posterior end spacing $S_{PE}$.

In the step 506, the first wedge portion 120 and the second wedge portion 122 may be formed in layers 121 (depicted in FIG. 8). That is, for each of the first wedge portion 120 and the second wedge portion 122, a base or first layer is formed from the trimmed excess material 144, extending the length $L_{WEDGE}$. Subsequent layers are then added to the base layer, with each subsequent layer having a shorter length than a previous layer. The subsequent layers are added so that anterior ends of each layer are aligned or are otherwise coplanar. Each subsequent layer may be heated and pressed onto the previous layer. In this manner, the first wedge portion 120 and the second wedge portion 122 may be formed in layers 121 and may be formed to have a tapered shape, with a maximum thickness $T_{MAX\_WEDGE}$ at the anterior end, and a minimum thickness $T_{MIN\_WEDGE}$ at the posterior end.

In an alternative embodiment, in step 506, the first wedge portion 120 and the second wedge portion 122 may be formed using another disk 140 of the moldable material, instead of using the trimmed excess material. In addition, in another alternative embodiment, after step 502, the method 500 may include additional steps of applying heat and pressure to one or more disks 140 of the moldable material to form additional layers in forming the molded disk 142. The method 500 may also include a step of molding the bottom surfaces of the wedge portions to fit the teeth 114 of the user. That is, if the impression used to form the main portion 102 corresponds to the upper teeth 134 of the user, the bottom surfaces of the wedge portions may be molded to fit the lower teeth 136 of the user, for example.

Further, the method 500 may include an additional step of smoothing trimmed surfaces of the main portion 102 following the step 504 of trimming the excess material 144. The smoothing of the trimmed surfaces may include heating and molding the trimmed surfaces to eliminate rough edges. The method 500 may also include a step of polishing the oral device 100 by heating. Heating for smoothing and polishing may be done using a torch, for example.

In another alternative embodiment, three-dimensional (3D) printing (or another form of additive manufacturing) may be used to form one or more portions of the oral device 100. For example, the 3D printing technique may be used to form the main portion 102 and/or the wedge portions of the oral device 100. More specifically, each layer of the wedge portions can be printed. And, as with the method 500, if the wedge portions are formed separately from the main portion 102, the wedge portions may be attached by applying heat to the upper surfaces of the wedge portion and the lower surface of the main portion 102, and pressing the upper surfaces of the wedge portions to the lower surface of the main portion 102.

In still another alternative embodiment, a protrusion may be provided on each of the wedge portions. The protrusion may be closer to the anterior end or the posterior end of the respective wedge portion. The oral device 100 having the protrusion may provide for translation of a lower jaw of the user relative to an upper jaw of the user, which may improve airflow, particularly during sleep. In particular, by virtue of the protrusion on the oral device 100, the lower teeth 136 of the user may be held in the wedge portions by the protrusion, thereby maintaining a translated position of the lower jaw of the user relative to the upper jaw of the user. In addition, the ridges 130 on the wedge portions may be formed to prevent translation of the lower jaw to the upper jaw.

The material used to form the oral device 100 may be, for example, ethylene vinyl acetate or polyvinyl siloxane. The material may be a gel-based material. Other materials may, however, be used to form the oral device 100.

The oral device 100 of this disclosure provides a mouthguard or a retainer that is customized to the user in being shaped to fit the teeth 114 of the user. The oral device 100 can be fit to either the upper teeth 134 or the lower teeth 136 of the user. A thickness of the main portion 102 and a thickness of the wedge portions of the oral device 100 are also customizable. The positioning of the wedge portions and, in particular, the positioning of the posterior ends of the wedge portions, having the minimum thickness $T_{MIN\_WEDGE}$, and the anterior ends of the wedge portions, having the maximum thickness $T_{MAX\_WEDGE}$, may be customized based on the teeth 114 of the user to ensure that the space 138 formed between the upper teeth 134 and the lower teeth 136 is sufficient for airflow. For example, the wedge portions may be positioned so that anterior ends of the wedge portions correspond to positions of canine teeth of the user, and posterior ends of the wedge portions correspond to positions of first molars of the user. In addition, colors of portions or all of the oral device 100 can be customized based on a preference of the user. Further, in addition to user-specific sizing of the oral device 100 and the sizing and placement of the wedge portions, the oral device 100 may be manufactured in predetermined general sizes, e.g., large, medium, small, and children's sized, with the wedge portions being sized and positioned according to the size of the oral device 100.

By virtue of the oral device 100 of the present disclosure, obstruction of airflow through the mouth 132 of the user is prevented by virtue of the wedge portions forming the space 138 between the upper teeth 134 and the lower teeth 136 of the user. The oral device 100 also provides protection to teeth and jaws of the user, providing added cushioning between the upper teeth 134 and the lower teeth 136.

It will be apparent to those skilled in the art that various modifications and variations can be made to the disclosed oral device without departing from the scope of the disclosure. Other embodiments of the oral device will be apparent to those skilled in the art from consideration of the specification and the accompanying figures. It is intended that the specification, and, in particular, the examples provided herein be considered as exemplary only, with a true scope of the disclosure being indicated by the following claims and their equivalents.

We claim:

1. An oral device comprising a body including:
   a main portion having an arch-shaped central portion, a first side portion extending from a first end of the central portion, and a second side portion extending from a second end of the central portion;
   a first wedge portion provided on a bottom surface of the first side portion, the first wedge portion having a minimum first wedge thickness at a posterior end thereof, and a maximum first wedge thickness at an anterior end thereof; and
   a second wedge portion provided on a bottom surface of the second side portion, the second wedge portion having a minimum second wedge thickness at a posterior end thereof, and a maximum second wedge thickness at an anterior end thereof,
   wherein the thickness is measured in a direction perpendicular to a direction extending between the posterior end and the anterior end of each of the first wedge portion and the second wedge portion,
   wherein the first wedge portion and the second wedge portion each include a plurality of layers and each layer, subsequent to an initial layer, has a shorter length than a previous layer.

2. The oral device of claim 1, wherein each of the first wedge portion and the second wedge portion has a wedge portion width, each of the first side portion and the second side portion has a side portion width, and the wedge portion width is less than the side portion width.

3. The oral device of claim 2, wherein the wedge portion width is between 20% and 50% of the side portion width.

4. The oral device of claim 1, wherein each of the first wedge portion and the second wedge portion has a wedge portion length, each of the first side portion and the second side portion has a side portion length, and the wedge portion length is less than the side portion length.

5. The oral device of claim 4, wherein the wedge portion length is between 50% and 100% of the side portion length.

6. The oral device of claim 1, wherein the first minimum wedge thickness and the second minimum wedge thickness are between 10% and 100% of the first maximum wedge thickness and the second maximum wedge thickness, respectively.

7. The oral device of claim 1, wherein at least one ridge is formed on each of a bottom surface of the first wedge portion and a bottom surface of the second wedge portion.

8. The oral device of claim 1, wherein anterior ends of the plurality of layers are aligned.

9. An oral device comprising a body having an inner surface configured to receive one of upper teeth or lower teeth of a user and a bottom surface configured to face another one of the upper teeth or the lower teeth of the user, the body including:
- a main portion having an arch-shaped central portion, a first side portion extending from a first end of the central portion, and a second side portion extending from a second end of the central portion;
- a first wedge portion provided on a bottom surface of the first side portion, the first wedge portion having a minimum first wedge thickness at a posterior end thereof, and a maximum first wedge thickness at an anterior end thereof; and
- a second wedge portion provided on a bottom surface of the second side portion, the second wedge portion having a minimum second wedge thickness at a posterior end thereof, and a maximum second wedge thickness at an anterior end thereof,
- wherein the anterior end of each of the first wedge portion and the second wedge portion is positioned closest to the central portion of the main portion, and the posterior end of each of the first wedge portion and the second wedge portion is positioned farthest from the central portion of the main portion, and
- wherein the thickness is measured in a direction perpendicular to a direction extending between the posterior end and the anterior end of each of the first wedge portion and the second wedge portion,
- wherein the first wedge portion and the second wedge portion each include a plurality of layers and each layer, subsequent to an initial layer, has a shorter length than a previous layer.

10. The oral device of claim 9, wherein each of the first wedge portion and the second wedge portion has a wedge portion width, each of the first side portion and the second side portion has a side portion width, and the wedge portion width is less than the side portion width.

11. The oral device of claim 10, wherein the wedge portion width is between 20% and 50% of the side portion width.

12. The oral device of claim 9, wherein each of the first wedge portion and the second wedge portion has a wedge portion length, each of the first side portion and the second side portion has a side portion length, and the wedge portion length is less than the side portion length.

13. The oral device of claim 12, wherein the wedge portion length is between 50% and 100% of the side portion length.

14. The oral device of claim 9, wherein the first minimum wedge thickness and the second minimum wedge thickness are between 10% and 100% of the first maximum wedge thickness and the second maximum wedge thickness, respectively.

15. The oral device of claim 9, wherein at least one ridge is formed on each of a bottom surface of the first wedge portion and a bottom surface of the second wedge portion.

16. The oral device of claim 9, wherein anterior ends of the plurality of layers are aligned.

* * * * *